(12) United States Patent
Verret

(10) Patent No.: US 9,646,424 B2
(45) Date of Patent: May 9, 2017

(54) METHODS AND PROCESSES FOR INTERACTIVE DISPLAY OF THREE DIMENSIONAL COVARIANCE

(71) Applicant: RAYTHEON COMPANY, Waltham, MA (US)

(72) Inventor: Jody D. Verret, Garland, TX (US)

(73) Assignee: RAYTHEON COMPANY, Waltham, MA (US)

(*) Notice: Subject to any disclaimer, the term of this patent is extended or adjusted under 35 U.S.C. 154(b) by 68 days.

(21) Appl. No.: 14/285,478

(22) Filed: May 22, 2014

(65) Prior Publication Data

US 2014/0354647 A1 Dec. 4, 2014

Related U.S. Application Data

(60) Provisional application No. 61/828,644, filed on May 29, 2013.

(51) Int. Cl.
| | |
|---|---|
| *G06T 19/00* | (2011.01) |
| *G06T 15/20* | (2011.01) |
| *G06T 11/60* | (2006.01) |
| *G06T 15/00* | (2011.01) |
| *G06T 3/00* | (2006.01) |
| *G06F 3/0484* | (2013.01) |
| *G06F 3/0481* | (2013.01) |

(Continued)

(52) U.S. Cl.
CPC ............... *G06T 19/20* (2013.01); *G01S 5/16* (2013.01); *G06T 2219/2004* (2013.01); *G06T 2219/2016* (2013.01)

(58) Field of Classification Search
CPC ......... G06T 19/00; G06T 15/20; G06T 11/60; G06T 15/005; G06T 3/0093; G06F 3/04842; G06F 3/0481; G06F 9/4443; G06F 3/04815; G09G 2340/0407; H04N 1/3872; G05B 19/042; G05B 21/02; G05B 15/02

See application file for complete search history.

(56) References Cited

U.S. PATENT DOCUMENTS

| | | | |
|---|---|---|---|
| 4,504,914 A | 3/1985 | Hofmann | |
| 5,629,707 A * | 5/1997 | Heuvel | G01S 5/02 342/357.2 |

(Continued)

OTHER PUBLICATIONS

Cole, D. M., & Newman, P. M. (May 2006). Using laser range data for 3D SLAM in outdoor environments. In Robotics and Automation, 2006. ICRA 2006. Proceedings 2006 IEEE International Conference on (pp. 1556-1563). IEEE.*

(Continued)

*Primary Examiner* — Ke Xiao
*Assistant Examiner* — Andrew Shin
(74) *Attorney, Agent, or Firm* — Lewis Roca Rothgerber Christie LLP

(57) ABSTRACT

A system and method for displaying a three-dimensional surface along with ellipsoids representing covariances. In one embodiment, at a point on a three dimensional surface, an ellipsoid is formed having principal axes proportional to the eigenvalues of a covariance matrix. The ellipsoid and the three-dimensional surface are projected onto a two-dimensional plane for display on a two-dimensional screen to a user. The covariance matrix may be an estimated error covariance or a sample covariance.

8 Claims, 11 Drawing Sheets

(51) Int. Cl.
*H04N 1/387* (2006.01)
*G06T 19/20* (2011.01)
*G01S 5/16* (2006.01)

(56) References Cited

U.S. PATENT DOCUMENTS

| | | | |
|---|---|---|---|
| 7,010,364 B1* | 3/2006 | Singh | G05B 19/41885 |
| | | | 700/108 |
| 8,965,107 B1* | 2/2015 | Schpok | G06K 9/00201 |
| | | | 382/154 |
| 2008/0260237 A1* | 10/2008 | Savolainen | G06K 9/0063 |
| | | | 382/154 |
| 2012/0045091 A1* | 2/2012 | Kaganovich | G06T 7/0071 |
| | | | 382/103 |
| 2012/0050528 A1 | 3/2012 | Davies et al. | |

OTHER PUBLICATIONS

Hansen, Nikolaus. "The CMA evolution strategy: a comparing review." Towards a new evolutionary computation. Springer Berlin Heidelberg, 2006. pp. 75-102.*

* cited by examiner

METHODS AND PROCESSES FOR INTERACTIVE DISPLAY OF THREE DIMENSIONAL COVARIANCE

CROSS-REFERENCE TO RELATED APPLICATION(S)

The present application claims priority to and the benefit of Provisional Application No. 61/828,644, filed May 29, 2013, entitled "METHODS AND PROCESSES FOR INTERACTIVE DISPLAY OF THREE DIMENSIONAL COVARIANCE", the entire content of which is incorporated herein by reference.

BACKGROUND

1. Field

This invention relates to improved methods and processes for dynamic display of three-dimensional (3D) covariance information.

2. Description of Related Art

Three dimensional (3D) processing may involve estimation of errors associated with such processing in the form of three-dimensional error covariance (a 3×3 covariance matrix). In related art embodiments, such information may be quantified via reduction to two values for the entire data set. These two values may be, for example, circular error, 90-percent probable (CE90) and linear error, 90-percent probable (LE90). While such a reduction is useful for a "ballpark" estimate of accuracy, it does not preserve the full rigorous error. Furthermore, it is not a useful way of capturing the error on a per-point basis in a 3D data set, since only two values are typically specified for the entire data set.

Examples in which such 3D error characterizations are important include digital elevation models (DEM), stereo image coordinates for targeting, laser detection and ranging (LADAR) data sets, and point clouds generated from multiple electro-optical (EO) images. Each of these 3D data sets has the potential for capturing a full 3×3 error covariance at every 3D point. Such error covariances are often referred to as "geopositioning error" or "geopositioning accuracy".

SUMMARY

Embodiments of the present invention provide a method for computing visualization parameters in the form of 3D error covariance ellipsoids and processes for dynamic display of such ellipsoids at every point in a 3D data set. Both absolute accuracy and relative (point-to-point) accuracies are accommodated by the present methods and processes. Further, since the methods are general to covariance, they are also suitable for accommodating sample covariance.

Embodiments of the present invention provide interactive user based visualization, the ability to dynamically scale ellipsoids, dynamic real-time computation and display of sample covariance, and dynamic real-time display of relative error covariance (error in distance measurement).

According to an embodiment of the present invention there is provided a method for displaying a three-dimensional surface, the method including: associating a covariance matrix with a first point on the surface; forming an ellipsoid, the ellipsoid including three major axes, each major axis having a length proportional to the square root of an eigenvalue of the covariance matrix, and being parallel to an eigenvector of the covariance matrix; displaying a two-dimensional projection of the surface; and displaying a two-dimensional projection of the ellipsoid at the first point.

In one embodiment, the covariance matrix is an estimated error covariance provided by a photogrammetric bundle adjustment algorithm.

In one embodiment, the covariance matrix is the sample covariance of points on the surface in a region around the first point.

In one embodiment, the method includes: receiving, through a user interface, a selection of a point of interest on the surface, wherein the covariance matrix is an estimated error covariance provided by a photogrammetric bundle adjustment algorithm at the point of interest.

In one embodiment, the receiving of a selection of a point of interest on the surface, the forming of an ellipsoid, and the displaying of a two-dimensional projection of the ellipsoid at the point on the surface include: receiving a selection of a point of interest on the surface in real time; forming an ellipsoid in real time; and displaying a two-dimensional projection of the ellipsoid in real time.

In one embodiment, the method includes: receiving an ellipsoid scale change command; and displaying an ellipsoid with a scale adjusted according to the received ellipsoid scale change command.

In one embodiment, the method includes: receiving, through a user interface, a selection of a point of interest, wherein the covariance matrix is the sample covariance of points on the surface in a region around the point of interest.

In one embodiment, the receiving of a selection of a point of interest on the surface, the forming of an ellipsoid, and the displaying of a two-dimensional projection of the ellipsoid at the point on the surface include: receiving a selection of a point of interest on the surface in real time; forming an ellipsoid in real time; and displaying a two-dimensional projection of the ellipsoid in real time.

In one embodiment, the method includes: receiving an ellipsoid scale change command; and displaying an ellipsoid with a scale adjusted according to the received ellipsoid scale change command.

In one embodiment, the covariance matrix is an estimated error covariance corresponding to a distance between the first point and a second point on the surface.

According to an embodiment of the present invention there is provided a system for displaying a three-dimensional surface, the system including a processing unit configured to: associate a covariance matrix with a first point on the surface; form an ellipsoid, the ellipsoid including three major axes, each major axis having a length proportional to the square root of an eigenvalue of the covariance matrix, and being parallel to an eigenvector of the covariance matrix; display a two-dimensional projection of the surface; and display a two-dimensional projection of the ellipsoid at the first point.

In one embodiment, the covariance matrix is an estimated error covariance provided by a photogrammetric bundle adjustment algorithm.

In one embodiment, the covariance matrix is the sample covariance of points on the surface in a region around the first point.

In one embodiment, the processing unit is further configured to: receive, through a user interface, a selection of a point of interest on the surface, and the covariance matrix is an estimated error covariance provided by a photogrammetric bundle adjustment algorithm at the point of interest.

In one embodiment, the receiving of a selection of a point of interest on the surface, the forming of an ellipsoid, and the displaying of a two-dimensional projection of the ellipsoid at the first point include: receiving a selection of a point of interest on the surface in real time; forming an ellipsoid in real time; and displaying a two-dimensional projection of the ellipsoid in real time.

In one embodiment, the processing unit is further configured to: receive an ellipsoid scale change command; and display an ellipsoid with a scale adjusted according to the received ellipsoid scale change command.

In one embodiment, the processing unit is further configured to receive, through a user interface, a selection of a point of interest, and the covariance matrix is the sample covariance of points on the surface in a region around the point of interest.

In one embodiment, the receiving of a selection of a point of interest on the surface, the forming of an ellipsoid, and the displaying of a two-dimensional projection of the ellipsoid at the point on the surface include: receiving a selection of a point of interest on the surface in real time; forming an ellipsoid in real time; and displaying a two-dimensional projection of the ellipsoid in real time.

In one embodiment, the processing unit is further configured to: receive an ellipsoid scale change command; and display an ellipsoid with a scale adjusted according to the received ellipsoid scale change command.

In one embodiment, the covariance matrix is an estimated error covariance corresponding to a distance between the first point and a second point on the surface.

BRIEF DESCRIPTION OF THE DRAWINGS

These and other features and advantages of the present invention will become appreciated as the same become better understood with reference to the specification, claims and appended drawings wherein:

DETAILED DESCRIPTION

Figure 1B:
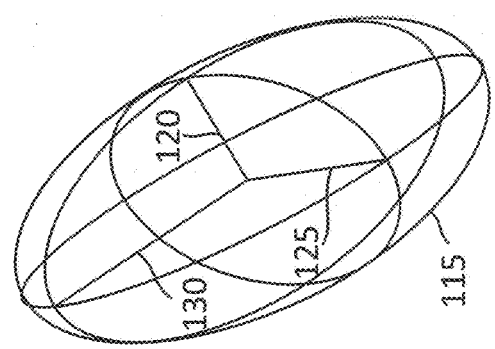
FIG. 1B is an illustration of a rotated error ellipsoid according to an embodiment of the present invention.

The detailed description set forth below in connection with the appended drawings is intended as a description of exemplary embodiments of methods and processes for interactive display of three-dimensional covariance provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

The methods of embodiments of the present invention for computing visualization parameters in the form of 3D covariance ellipsoids are as follows:

Let $$\underset{3X3}{C} = \begin{bmatrix} c_{xx} & c_{xy} & c_{xz} \\ c_{yx} & c_{yy} & c_{yz} \\ c_{zx} & c_{zy} & c_{zz} \end{bmatrix} \quad (1)$$

represent a 3D covariance matrix in x, y, z. Note that C can represent either an error covariance or a sample covariance. Such a covariance matrix is symmetric and real. The finite-dimensional spectral theorem states that any such matrix can be diagonalized by an orthogonal 3×3 matrix Q such that $$D = Q^T C Q \quad (2)$$

where D is 3×3 and diagonal:

$$D \equiv \begin{bmatrix} d_{00} & 0 & 0 \\ 0 & d_{11} & 00 \\ 0 & 0 & d_{22} \end{bmatrix} \quad (3)$$

Finding matrices D and Q is an eigenvalue-eigenvector problem for real symmetric matrices. Eigen-decomposition of C thus provides matrices Q and D such that $$C = QDQ^T \quad (4)$$

where the columns of the matrix Q provide the eigenvectors and the diagonal elements of D provide the corresponding eigenvalues.

The general law of propagation of errors states that if $C_R$ is a 3×3 covariance in a 3D space, R, and $C_S$ is a corresponding 3×3 covariance in space S, then $$C_S = \frac{\partial S}{\partial R} C_R \left[ \frac{\partial S}{\partial R} \right]^T \quad (5)$$

where $$\frac{\partial S}{\partial R}$$

is the Jacobian of partial derivatives of space S with respect to space R. In particular if a vector $V_R$ in space R is rotated to a vector $V_S$ in space S via a 3×3 rotation matrix U (i.e. $V_S=UV_R$) then the Jacobian is simply the rotation matrix U. Equation (5) is then of the form $$C_S=UC_RU^T \quad (6)$$

One can see that the matrix Q in equation (4) fits the form of equation (6). An eigenfactoring of C thus provides the following:

1. Eigenvalues from the diagonal of D provide the lengths of the axes of a "principal" ellipsoid associated with C
2. Eigenvectors in the matrix of eigenvectors, Q, provide the principal directions of C, and thus a rotation matrix characterizing how the principal ellipsoid is rotated. (A "principal" ellipsoid in this context is one whose axes are aligned with the canonical X, Y and Z axes.)

The general equation of a principal ellipsoid is given by $$\frac{x^2}{a^2} + \frac{y^2}{b^2} + \frac{z^2}{c^2} = 1 \quad (7)$$

where the values a, b, and c are the lengths of the principal x, y, and z axes respectively. Using the eigenvalues from the matrix D, we can construct a principal (i.e. non-rotated) error ellipse via the following substitutions $$a^2=d_{00}$$
$$b^2=d_{11}$$
$$c^2=d_{22} \quad (8)$$

Rotating such a "principal" ellipsoid by the eigenmatrix Q provides an ellipsoid which is consistent with the original covariance matrix C via the law of propagation of errors.

The process for visualization of a covariance matrix C in its proper orientation is achieved by invoking standard eigenfactor routines to C to arrive at matrices Q and D:

$$[Q,D]=\text{eigenfactor}(C) \quad (9)$$

For visualization, a 3D principal ellipsoid is constructed via equations (7) and (8) and translated to the 3D location of interest (e.g. a user's 3D cursor location). Points x, y, z on the principal ellipsoid are obtained via evaluation of equation (7). These points are then rotated via matrix Q:

$$\begin{bmatrix} x' \\ y' \\ z' \end{bmatrix} = Q \begin{bmatrix} x \\ y \\ z \end{bmatrix} \quad (10)$$

Figure 1A:
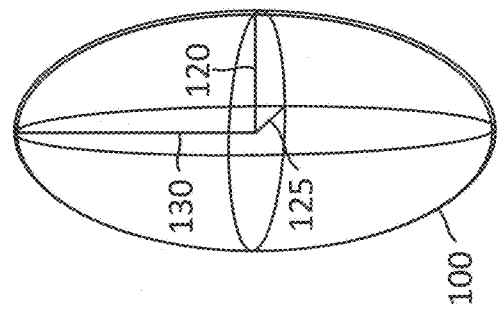
FIG. 1A is an illustration of a principal error ellipsoid according to an embodiment of the present invention.

The result is a set of points ($[x'y'z']^T$) oriented consistent with C. FIG. 1 illustrates a principal ellipsoid 110 and a rotated ellipsoid 115. For this figure, the principal axes were also plotted and rotated via $[\hat{x}\hat{y}\hat{z}]=QD$. Within FIG. 1A and FIG. 1B, a first line 120, a second line 125, and a third line 130 represent the principal axes for x, y, z respectively. Each of the 2D ellipses is normal to one of the axes. FIG. 1A shows a canonical ellipsoid whose axis lengths are the square roots of the eigenvalues a, b, c. FIG. 1B shows an oriented ellipsoid consistent with the rotation matrix formed from the eigenvectors (Q).

EXAMPLES

The following figures show some real-world examples. The ellipsoids were produced via computations from formulations described above and displayed interactively from a custom-built 3D visualization tool designed for dynamic display of such ellipsoids.

Elements of embodiments of the present invention may be implemented using one or more processing units. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). The term "processing unit" is used herein to include any combination of hardware, firmware, and software, employed to process data or digital signals. In a processing unit, as used herein, each function is performed either by hardware configured, i.e., hard-wired, to perform that function, or by more general purpose hardware, such as a CPU, configured to execute instructions stored in a non-transitory storage medium. The processing unit receives data from which it generates, internally, three-dimensional objects, such as 3D surfaces and ellipsoids, and from which it forms two-dimensional projections for display on a two-dimensional display screen. A user may interact with the processing unit using, e.g., a keyboard and a mouse for input, and viewing the results on the display.

Figure 2A:
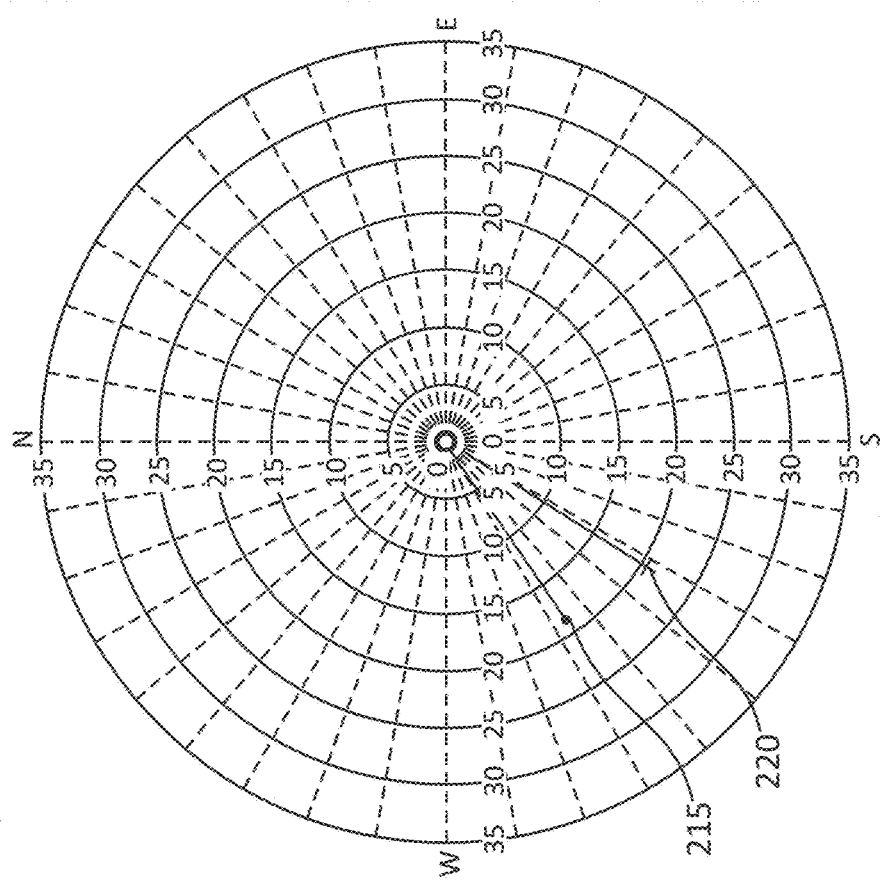
FIG. 2A is a polar plot of the sensor azimuth and off-nadir angles for two images, according to an embodiment of the present invention.
Figure 2B:
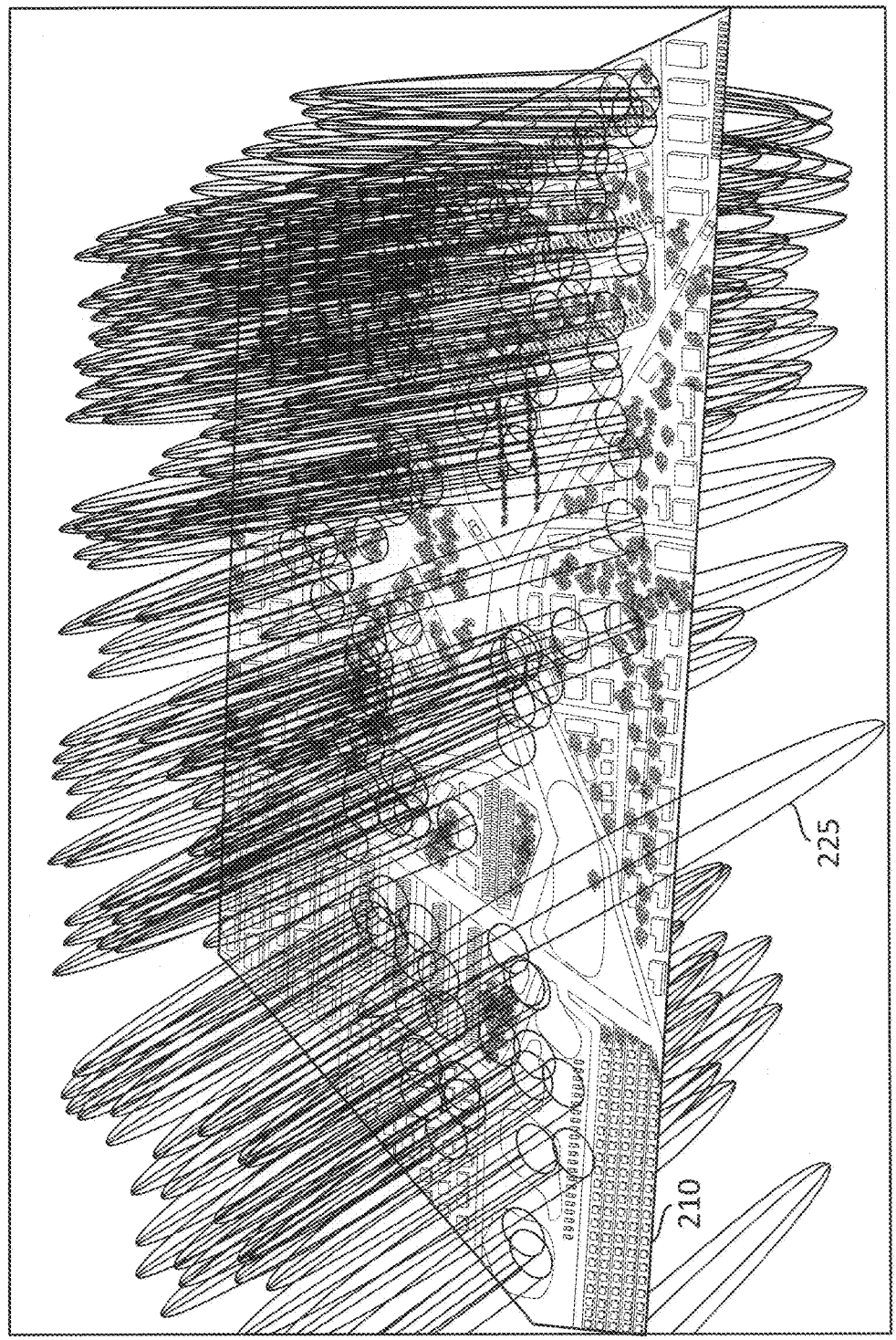
FIG. 2B is an illustration of a set of two-image predicted geolocation error ellipsoids according to an embodiment of the present invention.

FIG. 2B shows a perspective view of a 3D surface 210 formed, in one embodiment, by combining two images of the ground, obtained with the two sensor viewing geometries 215, 220 illustrated in FIG. 2A. FIG. 2A shows a polar plot illustrating the image viewing geometries, in the form of azimuth angle to sensor (polar angle) and off-nadir sensor angle (polar radius). The sensor may be an electro-optical (EO) sensor such as a commercial imaging satellite. The 3D surface 210 is composed of a point cloud formed by registering EO images via photogrammetric bundle adjustment from data obtained from the two directions identified in FIG. 2A. The point cloud is extracted from the EO images via a multiray intersection of image coordinates on the ground. Each point in the point cloud is rendered with a brightness corresponding to the average intensity of the EO images. Superimposed on the 3D surface is a plurality of covariance ellipsoids 225, each representing the estimated error covariance provided by a photogrammetric bundle adjustment algorithm. The 3D surface 210 and the ellipsoids 225 are represented internally, in the processing unit, as three-dimensional objects. In this representation, the principal axes of each ellipsoid 225 are oriented parallel to the corresponding eigenvectors of the covariance matrix the ellipsoid represents.

The 3D surface 210 and the ellipsoids 225 are projected numerically onto a two-dimensional projection plane for display, to a user, on a two-dimensional display screen. A user viewing the image of FIG. 2B and using a user interface device, such as a mouse, to control a cursor, may select points of interest on the 3D surface at which error ellipsoids are to be displayed. The user may also change the scale of the ellipsoids by sending to the processing unit an ellipsoid scale change command, e.g., by pressing the ">" key on a keyboard to increase the scale or pressing the "<" key to decrease the scale. In another embodiment, the system computes and displays, dynamically and in real time, an error ellipsoid at the sequence of points of interest corresponding to the instantaneous cursor position as the cursor is moved around the image by the user, with the error ellipsoid updated as the cursor moves. The user may also command the processing unit to adjust the viewing angle, i.e., command the processing unit to rotate the 3D surface and any attached ellipsoids. This command may be issued by the user's dragging of a point on the surface with the mouse. The processing unit may respond to a user command to change the viewing angle by rotating the three-dimensional objects relative to the projection plane. The users may also command the processing unit to change the zoom, i.e., the magnification or "scale" of the entire image including the 3D surface and any attached ellipsoids, and the processing unit may respond by changing the scale of the projection shown on the display.

Figure 3A:
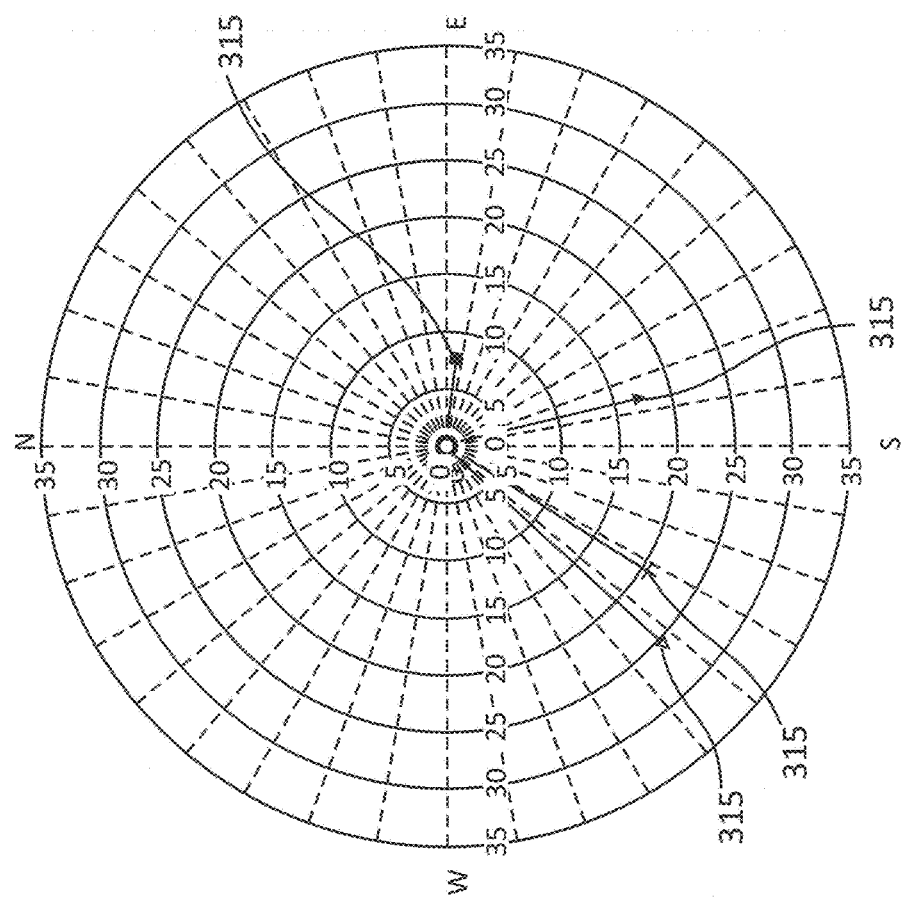
FIG. 3A is a polar plot of the sensor azimuth and off-nadir angles for four images, according to an embodiment of the present invention.
Figure 3B:
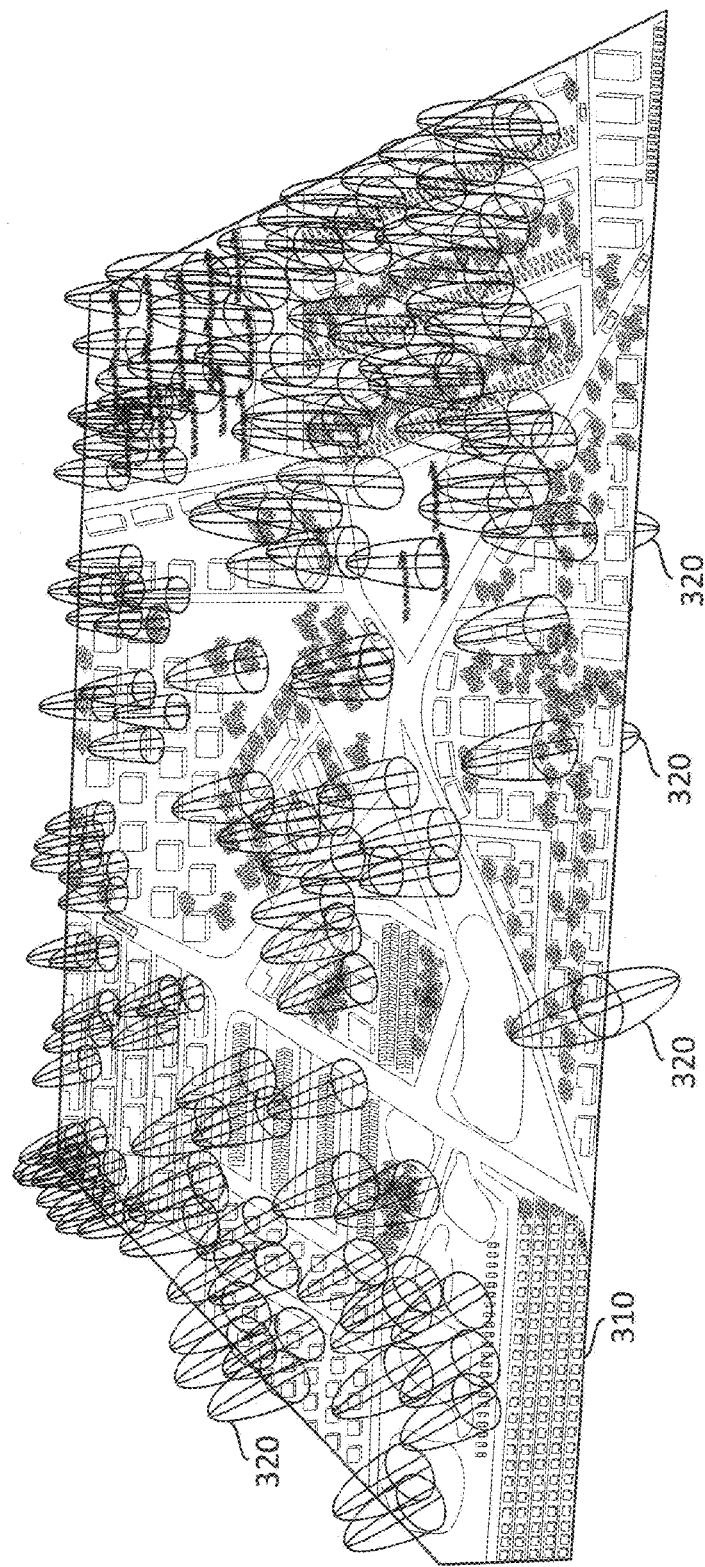
FIG. 3B is an illustration of a set of four-image predicted geolocation error ellipsoids according to an embodiment of the present invention.
Figure 4A:
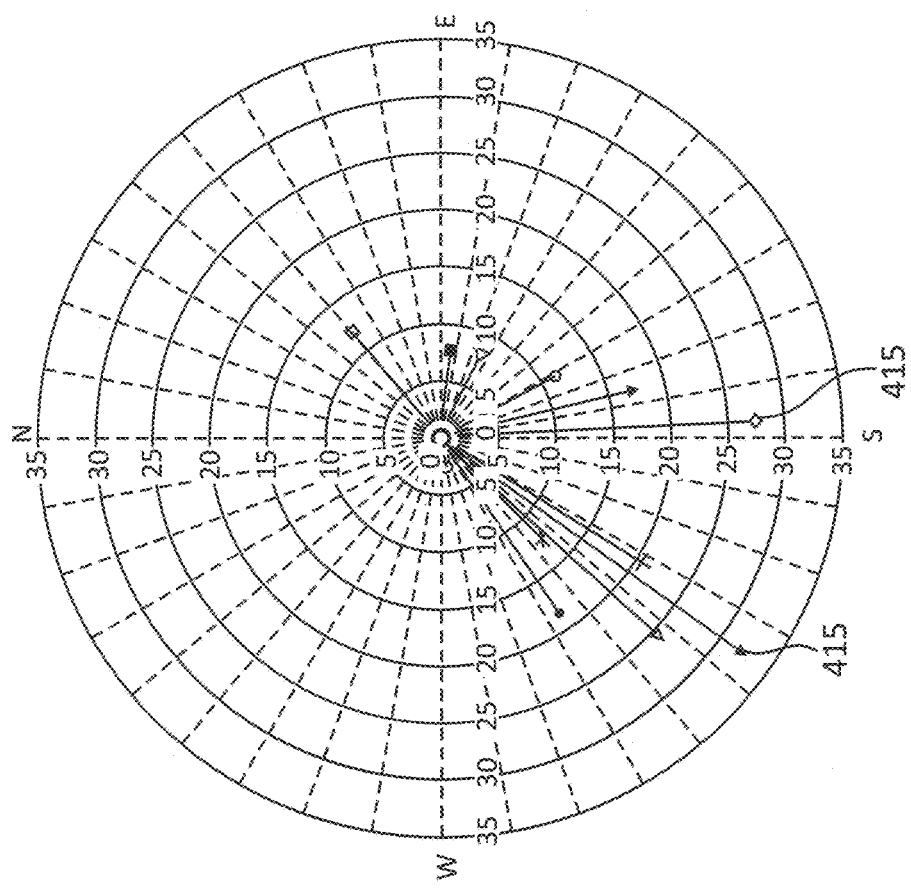
FIG. 4A is a polar plot of the sensor azimuth and off-nadir angles for twelve images, according to an embodiment of the present invention.
Figure 4B:
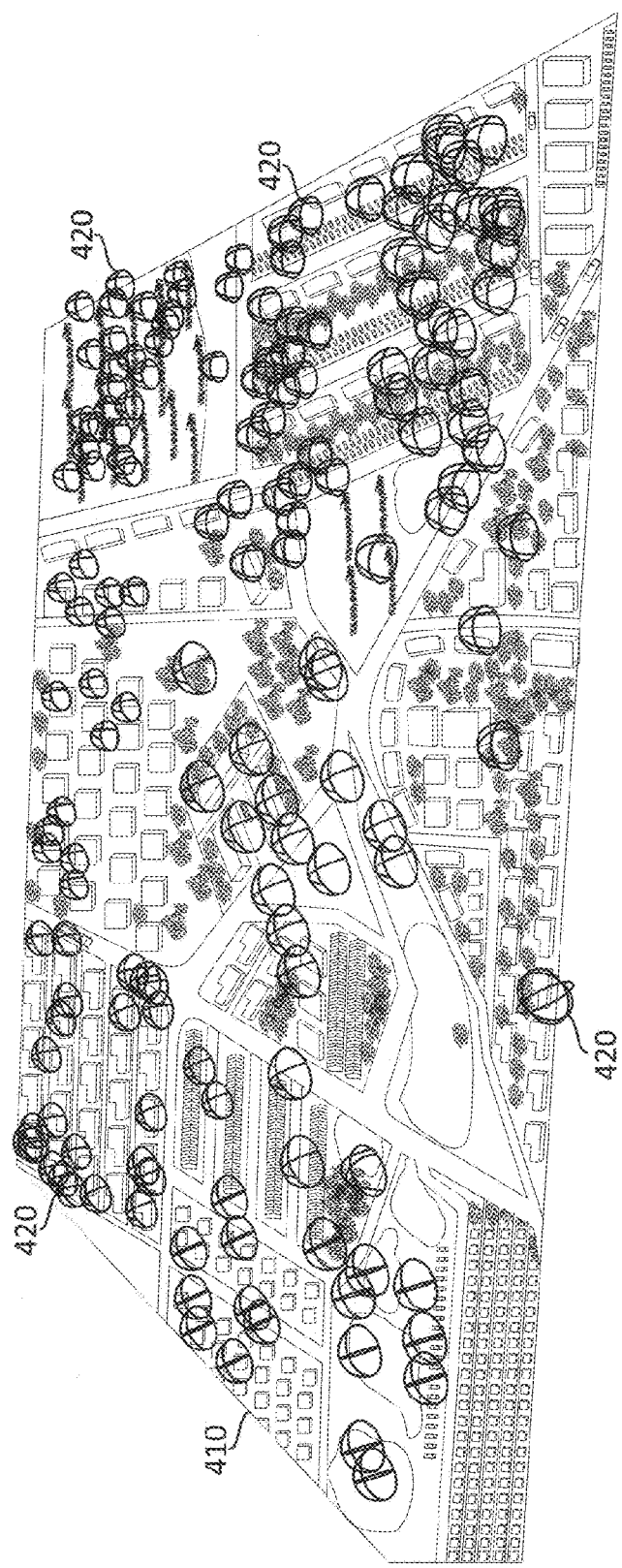
FIG. 4B is an illustration of a set of twelve-image predicted geolocation error ellipsoids according to an embodiment of the present invention.

FIG. 3B shows a perspective view of a 3D surface 310 formed by combining four images of the ground, obtained with the four sensor viewing geometries 315 illustrated in the polar plot of FIG. 3A. The error ellipsoids 320 illustrated in FIG. 3B are smaller than the error ellipsoids 225 of FIG. 2B as a result of the greater number of images and of the greater geometric diversity of the sensor viewing geometries used to obtain the images. FIG. 4B shows a perspective view of a 3D surface 410 formed by combining twelve images of the ground, obtained with the twelve sensor viewing geometries 415 illustrated in the polar plot of FIG. 3A. The error ellipsoids 420 illustrated in FIG. 4B are further reduced in size, again as a result of the still greater number of images and of the still greater geometric diversity of the sensor viewing geometries used to obtain the images.

As can be seen in these examples, including more images in the adjustment with varying geometric diversity improves the geolocation accuracy estimates of the multi-image product. An example of a multi-image product may be a DEM or point cloud extracted from the multiple images. In one embodiment, the user interface provides a method for a user to draw a line (e.g., by dragging a mouse) between two points on the displayed surface, and the system displays the calculated distance between the two points and an error ellipsoid corresponding to the estimated error in the calculated distance.

Figure 5A:
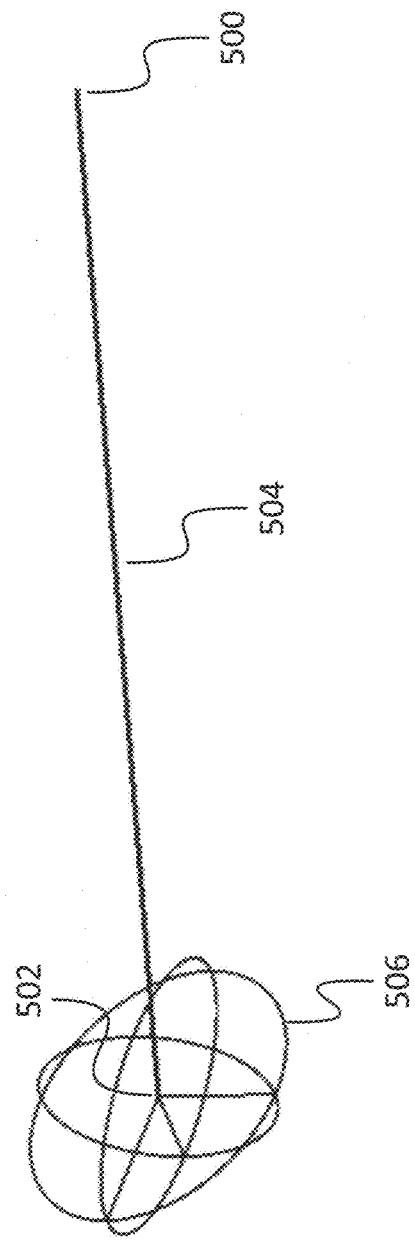
FIG. 5A is an illustration of a relative error ellipsoid according to an embodiment of the present invention.
Figure 5B:
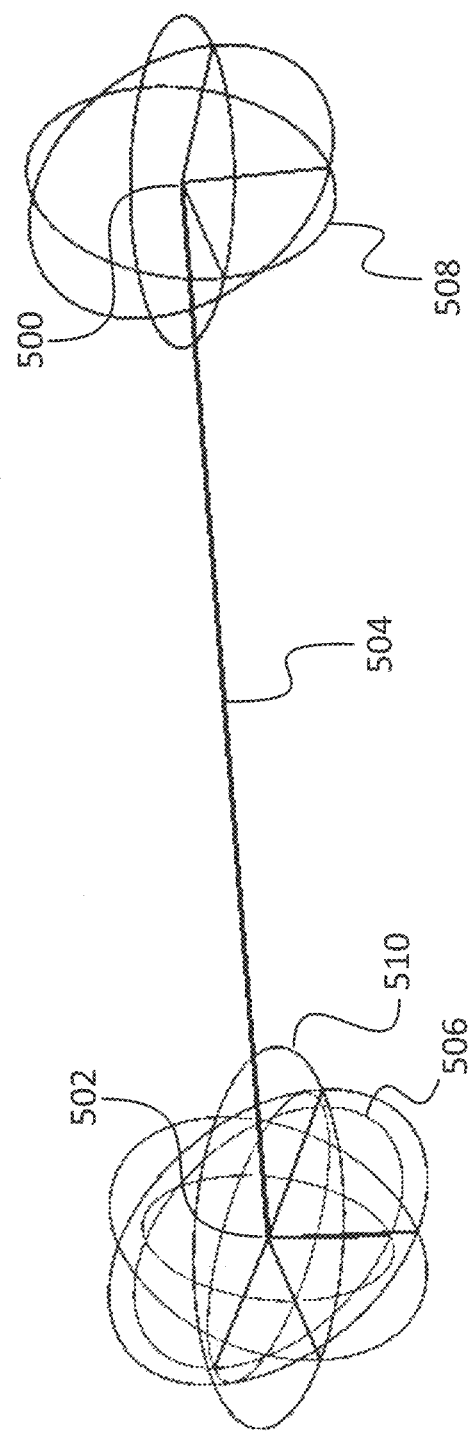
FIG. 5B is an illustration of a relative error ellipsoid along with two absolute error ellipsoids according to an embodiment of the present invention.

In addition to absolute covariance ellipsoids discussed above, in one embodiment the process also provides for display of computed point-to-point covariances. Point-to-point covariances represent the relative error between two 3D points (i.e. the error in the distance measurement between two points). Referring to FIG. 5A, for interactive display of relative error, the user selects two 3D points. The first is an "anchor" point 500 and the second is a dynamically selected auxiliary point 502. A line 504 is drawn by the processor between the user-selected anchor point 500 and the dynamically changing auxiliary point 502. At the end of the line is displayed a relative covariance ellipsoid 506 associated with a measurement of the distance between the two points. Referring to FIG. 5B, the process allows for display of absolute covariance ellipsoids 508, 510 at the two points along with the relative covariance ellipsoid 506; alternatively only the relative covariance ellipsoid 506 can be displayed, as in FIG. 5A.

Figure 6B:
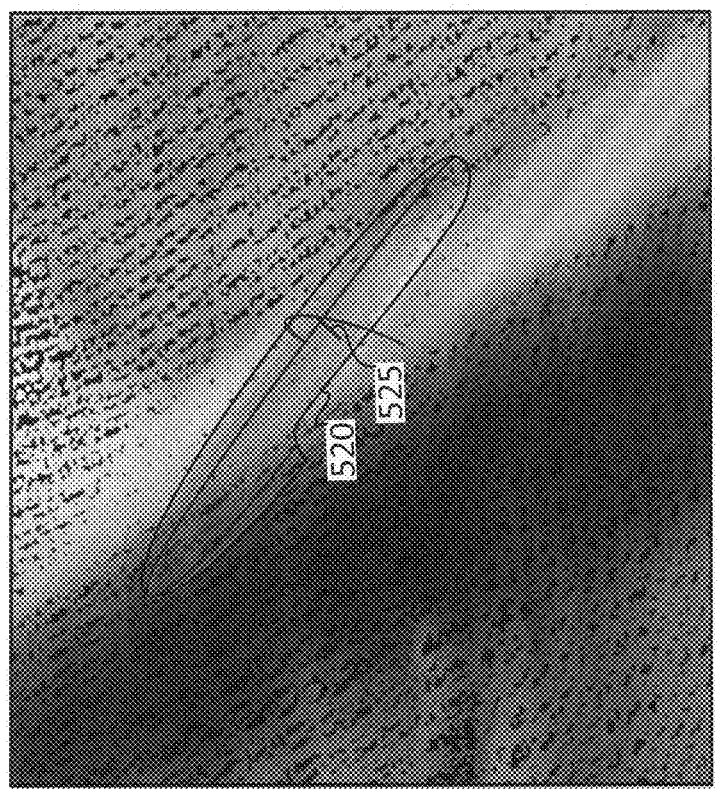
FIG. 6B is a magnified view of a portion of the illustration of FIG. 5A, showing a sample covariance ellipsoid at a point on a three-dimensional surface according to an embodiment of the present invention.
Figure 6A:
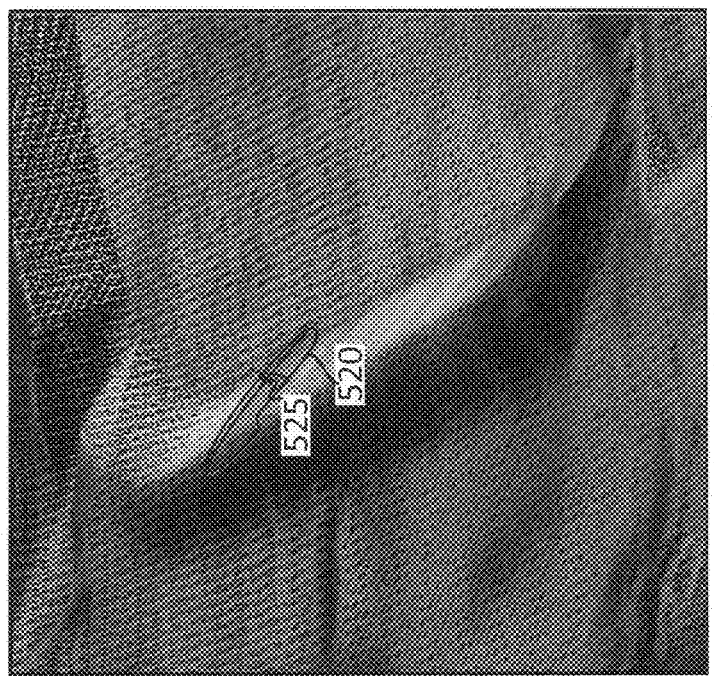
FIG. 6A is an illustration of a sample covariance ellipsoid at a point on a three-dimensional surface according to an embodiment of the present invention.

FIGS. 6A and 6B show an example of visualization of dynamically-computed sample covariance ellipsoids. The sample covariance in this example was computed by sampling 3D LADAR points,
Sample covariance differs from error covariance in that it is derived from an actual sampling of local x, y, z coordinates (as contrasted with accuracy of those coordinates). Three-dimensional sample covariance is computed via the following formulas.

$$sampleCovariance = \underset{3X3}{C} = \frac{1}{N-1}\left(\underset{3XN}{B^T}\underset{NX3}{B}\right) \quad (11)$$

Where $$\underset{NX3}{B} = \begin{bmatrix} x_1 - \mu_x & y_1 - \mu_y & z_1 - \mu_z \\ x_2 - \mu_x & y_2 - \mu_y & z_2 - \mu_z \\ \vdots & \vdots & \vdots \\ x_N - \mu_x & y_N - \mu_y & z_N - \mu_z \end{bmatrix} \quad (12)$$

with $$\mu_x = \frac{1}{N}\sum_{i=1}^{N} x_i \quad (13)$$

$$\mu_y = \frac{1}{N}\sum_{i=1}^{N} y_i \quad (14)$$

$$\mu_z = \frac{1}{N}\sum_{i=1}^{N} z_i \quad (15)$$

In one embodiment, the point locations $[x_i, y_i, z_i]$ are formed from a sampling of points in a region around the user's cursor. The sample covariance, displayed in FIGS. 6A and 6B as the sample covariance ellipsoid 520, provides characterization of the "local shape" of a surface. In particular, the orientation and direction of the smallest eigenvector (the line 525) may represent the surface normal of the local data.

Figure 7:
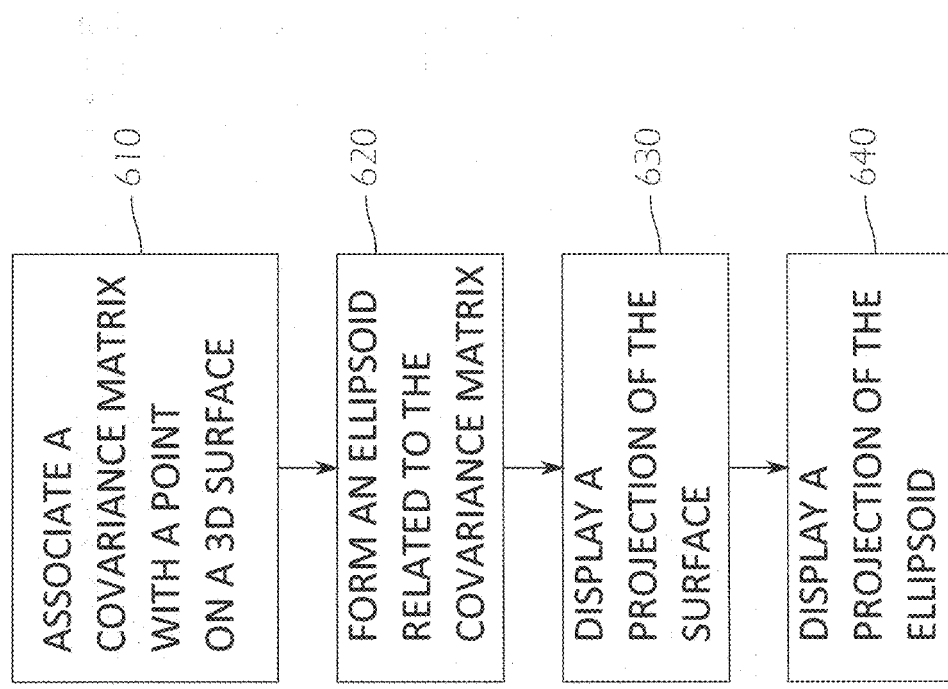
FIG. 7 is a flow chart illustrating a method for interactive display of three-dimensional covariance according to an embodiment of the present invention.

Referring to FIG. 7, in one embodiment of the present invention a method for interactive display of three-dimensional covariance begins with associating, in an act 610, a covariance matrix with a point on a 3D surface. The covariance matrix may be a sample covariance or an error covariance. Next, in an act 620, an ellipsoid related to the covariance matrix is formed; the ellipsoid has three major axes, the length of each major axis being proportional to the square root of an eigenvalue of the covariance matrix, and each major axis being parallel to an eigenvector of the covariance matrix. In acts 630 and 640, the surface and the ellipsoid may then each be projected onto a two-dimensional plane, for display on a two-dimensional display.

Novel features of embodiments of the present invention include: interactive user based visualization, ability to dynamically scale ellipsoids, dynamic real-time computation and display of sample covariance, dynamic real-time display of relative error covariance (error in distance measurement).

Although limited embodiments of methods and processes for interactive display of three-dimensional covariance have been specifically described and illustrated herein, many modifications and variations will be apparent to those skilled in the art. Accordingly, it is to be understood that the methods and processes for interactive display of three-dimensional covariance employed according to principles of this invention may be embodied other than as specifically described herein. The invention is also defined in the following claims, and equivalents thereof.

What is claimed is:
1. A method for displaying a three-dimensional surface, the method comprising:
using an electro-optical sensor to generate a plurality of images of a physical surface;
generating the three-dimensional surface from the plurality of images, using a multiray intersection of image coordinates on the physical surface and a photogrammetric bundle adjustment algorithm;
associating a covariance matrix with a first point on the three-dimensional surface;
forming an ellipsoid, the ellipsoid comprising three major axes, each major axis having a length proportional to the square root of an eigenvalue of the covariance matrix, and being parallel to an eigenvector of the covariance matrix;
displaying a two-dimensional plane projection of the three-dimensional surface, a brightness of each point of the two-dimensional plane projection of the three-dimensional surface corresponding to an average intensity of corresponding points in the images; and
displaying a two-dimensional plane projection of the ellipsoid at the first point,
wherein the covariance matrix is a sample covariance of points on the three-dimensional surface in a region around the first point, the sample covariance C being given by $$\underset{3X3}{C} = \frac{1}{N-1}\left(\underset{3XN}{B}^T \underset{NX3}{B}\right),$$

wherein $$\underset{NX3}{B} = \begin{bmatrix} x_1 - \mu_x & y_1 - \mu_y & z_1 - \mu_z \\ x_2 - \mu_x & y_2 - \mu_y & z_2 - \mu_z \\ \vdots & \vdots & \vdots \\ x_N - \mu_x & y_N - \mu_y & z_N - \mu_z \end{bmatrix},$$

$$\mu_x = \frac{1}{N}\sum_{i=1}^{N} x_i,$$

$$\mu_y = \frac{1}{N}\sum_{i=1}^{N} y_i, \text{ and}$$

$$\mu_z = \frac{1}{N}\sum_{i=1}^{N} z_i,$$

wherein $x_i$, $y_i$, and $z_i$ are coordinates of an $i^{th}$ point of N points in the region.

2. The method of claim 1, further comprising:
receiving, through a user interface, a selection of a point of interest on the three-dimensional surface.

3. The method of claim 2, wherein:
the receiving of a selection of a point of interest on the three-dimensional surface, the forming of an ellipsoid, and the displaying of a two-dimensional plane projection of the ellipsoid at the point on the three-dimensional surface comprise:
receiving a selection of a point of interest on the three-dimensional surface in real time;
forming an ellipsoid in real time; and
displaying a two-dimensional plane projection of the ellipsoid in real time.

4. The method of claim 2, further comprising:
receiving an ellipsoid scale change command; and
displaying an ellipsoid with a scale adjusted according to the received ellipsoid scale change command.

5. A system for displaying a three-dimensional surface, the system comprising a processing unit configured to:
receive a plurality of images of a physical surface;
generate the three-dimensional surface from the plurality of images, using a multiray intersection of image coordinates on the physical surface and a photogrammetric bundle adjustment algorithm;
associate a covariance matrix with a first point on the three-dimensional surface;
form an ellipsoid, the ellipsoid comprising three major axes, each major axis having a length proportional to the square root of an eigenvalue of the covariance matrix, and being parallel to an eigenvector of the covariance matrix;
display a two-dimensional plane projection of the three-dimensional surface, a brightness of each point of the two-dimensional plane projection of the three-dimensional surface corresponding to an average intensity of corresponding points in the images; and
display a two-dimensional plane projection of the ellipsoid at the first point,
wherein the covariance matrix is a sample covariance of points on the three-dimensional surface in a region around the first point, the sample covariance C being given by $$\underset{3X3}{C} = \frac{1}{N-1}\left(\underset{3XN}{B}^T \underset{NX3}{B}\right),$$

wherein $$\underset{NX3}{B} = \begin{bmatrix} x_1 - \mu_x & y_1 - \mu_y & z_1 - \mu_z \\ x_2 - \mu_x & y_2 - \mu_y & z_2 - \mu_z \\ \vdots & \vdots & \vdots \\ x_N - \mu_x & y_N - \mu_y & z_N - \mu_z \end{bmatrix},$$

$$\mu_x = \frac{1}{N}\sum_{i=1}^{N} x_i,$$

$$\mu_y = \frac{1}{N}\sum_{i=1}^{N} y_i, \text{ and}$$

$$\mu_z = \frac{1}{N}\sum_{i=1}^{N} z_i,$$

wherein $x_i$, $y_i$, and $z_i$ are coordinates of an $i^{th}$ point of N points in the region.

6. The system of claim 5, wherein the processing unit is further configured to receive, through a user interface, a selection of a point of interest on the three-dimensional surface.

7. The system of claim 6, wherein:
the receiving of a selection of a point of interest on the three-dimensional surface, the forming of an ellipsoid, and the displaying of a two-dimensional plane projection of the ellipsoid at the first point comprise:
receiving a selection of a point of interest on the three-dimensional surface in real time;
forming an ellipsoid in real time; and
displaying a two-dimensional plane projection of the ellipsoid in real time.

8. The system of claim 6, wherein the processing unit is further configured to:
receive an ellipsoid scale change command; and
display an ellipsoid with a scale adjusted according to the received ellipsoid scale change command.

* * * * *